(12) United States Patent
Kimura

(10) Patent No.: US 12,449,544 B2
(45) Date of Patent: Oct. 21, 2025

(54) LIGHT RANGING APPARATUS

(71) Applicant: DENSO CORPORATION, Kariya (JP)

(72) Inventor: Teiyu Kimura, Kariya (JP)

(73) Assignee: DENSO CORPORATION, Kariya (JP)

( * ) Notice: Subject to any disclaimer, the term of this patent is extended or adjusted under 35 U.S.C. 154(b) by 1332 days.

(21) Appl. No.: 17/138,698

(22) Filed: Dec. 30, 2020

(65) Prior Publication Data

US 2021/0116572 A1 Apr. 22, 2021

Related U.S. Application Data

(63) Continuation of application No. PCT/JP2019/025779, filed on Jun. 28, 2019.

(30) Foreign Application Priority Data

Jul. 2, 2018 (JP) .................................. 2018-125939

(51) Int. Cl.
*G01S 17/894* (2020.01)
*G01S 7/481* (2006.01)
*G01S 7/4915* (2020.01)
*G01S 17/931* (2020.01)

(52) U.S. Cl.
CPC .......... *G01S 17/894* (2020.01); *G01S 7/4814* (2013.01); *G01S 7/4816* (2013.01); *G01S 7/4915* (2013.01); *G01S 17/931* (2020.01)

(58) Field of Classification Search
None
See application file for complete search history.

(56) References Cited

FOREIGN PATENT DOCUMENTS

| CN | 104833979 A | | 8/2015 |
|---|---|---|---|
| JP | 2006105647 A | | 4/2006 |
| JP | 2014-077658 A | | 5/2014 |
| JP | 2014-081254 A | | 5/2014 |
| JP | 2016161438 A | * | 9/2016 |
| JP | 2016-176750 A | | 10/2016 |

* cited by examiner

*Primary Examiner* — Isam A Alsomiri
*Assistant Examiner* — Sanjida Naser
(74) *Attorney, Agent, or Firm* — Maschoff Brennan

(57) ABSTRACT

A light ranging apparatus is provided with a light source; a light receiving unit having a plurality of light receiving elements capable of outputting a pulse signal; a summing unit calculating a sum value by summing the number of pulses; a histogram generation unit generating a histogram that records the sum value; a peak detecting unit acquiring the sum value of the peak in the histogram to be a signal intensity and calculating a distance value; and a first low signal intensity detecting unit detecting a low signal intensity lower than a predetermined first threshold. The histogram generation unit repeatedly acquires and accumulates the sum value for the histogram where the low signal intensity is detected until the signal intensity becomes the first threshold or more, thereby updating the histogram; and the peak detecting unit calculates a new distance value from the updated histogram.

3 Claims, 13 Drawing Sheets

LIGHT RANGING APPARATUS

CROSS-REFERENCE TO RELATED APPLICATION

This application is the U.S. bypass application of International Application No. PCT/JP2019/025779 filed Jun. 28, 2019 which designated the U.S. and claims priority to Japanese Patent Application No. 2018-125939, filed Jul. 2, 2018, the contents of which are incorporated herein by reference.

BACKGROUND

Technical Field

The present disclosure relates to a light ranging apparatus.

Description of the Related Art

A light ranging apparatus in which laser light is emitted to detect distance to an object is known. As an example, a light ranging apparatus is disclosed in which a histogram is generated where the horizontal axis corresponds to a travel time of light and the vertical axis corresponds to the number of detections of a receiving element in the travel time and the distance to the object is calculated based on the histogram.

SUMMARY

The present disclosure can be embodied in accordance with the following aspects.

According to the present disclosure, a light ranging apparatus is provided. The light ranging apparatus includes a light source; a light receiving unit having a plurality of light receiving elements; a summing unit that calculates a sum value for each respective light receiving elements; a histogram generation unit that generates a histogram for each element in an image region corresponding to the predetermined range; a peak detecting unit that detects a peak from the histogram, acquires the sum value of the peak to be a signal intensity and calculates a distance value; a first low signal intensity detecting unit that detects a low signal intensity from among signal intensities.

BRIEF DESCRIPTION OF THE DRAWINGS

The above-described object, other objects, features and advantages in the present disclosure become more clarified by the following detailed description with reference to the drawings.

In the accompanying drawings.

DETAILED DESCRIPTION OF THE PREFERRED EMBODIMENTS

As an example of a light ranging apparatus, JP-A-2016-161438 discloses a technique in which a histogram is generated with a horizontal axis corresponding to a travel time of light measured by measuring time and a vertical axis as the number of detections of a receiving element in the travel time, and a distance between the own apparatus and an object around the vehicle is calculated based on the histogram. Further, PTL1 discloses a technique in which the laser light is repeatedly emitted to accumulate the amount of reactions and secure the input dynamic range, thereby discriminating between disturbance light and reflected light.

However, when accumulating the number of detections, although the dynamic range increases, since the travel time of the light varies if the object to be measured is moving, the position on the horizontal axis where the number of reactions is accumulated is shifted. Hence, in the case where the accumulation is applied to the entire measurement range, ranging accuracy or positional resolution may be lowered. Moreover, when such an accumulation process is performed for the entire measurement range, an amount of calculation increases causing an increase in the power consumption. Accordingly, a technique capable of reducing the number of accumulations required to generate the histogram is desired in the light ranging apparatus.

Hereinafter, embodiments of the present disclosure will be described with reference to the drawings.

First Embodiment

Figure 1:
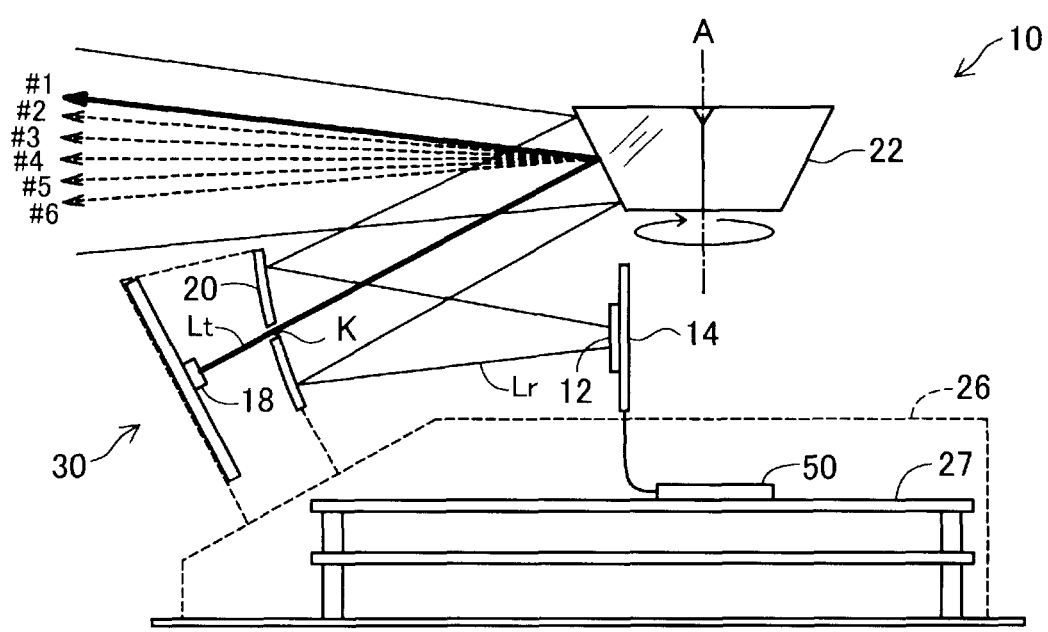
FIG. 1 is an explanatory diagram showing an overall configuration of a light ranging apparatus.

As shown in FIG. 1, a light ranging apparatus 10 of a first embodiment according to the present disclosure is provided with a light source 30, a light receiving IC 14, a hyperboloid mirror 20, a polygon mirror 22, a casing 26 and a control unit 50. The light ranging apparatus 10 is, for example, mounted on a vehicle and used for detecting an object and measuring a distance to the object.

The light source 30 generates irradiation light Lt for irradiating a predetermined measurement object range. According to the present embodiment, the light source 30 is provided with a laser diode 18 as a light source. The laser diode 18 emits, as the irradiation light Lt, a pulsed laser light which repeats flashing with a predetermined pulse width and a predetermined period. The irradiation light Lt is lead to the polygon mirror 22 from an opening K provided in the hyperboloid mirror 20. The beam shape of the pulse laser light emitted from the light source 30 is formed into a longitudinal shape in the vertical direction. According to the present embodiment, the laser diode 18 is used for the light source. However, other light sources such as a solid-state laser may be used.

The polygon mirror 22 is configured as rotatable polygonal mirror having six mirror surfaces. The polygon mirror 22 reflects the irradiation light Lt at each mirror surface, thereby emitting the irradiation light towards the measurement object range. In the case where an object is present in the measurement object range, the object reflects the irradiation light Lt which is lead to the polygon mirror 22.

The polygon mirror 22 leads the reflected light received from the measurement object range to the hyperboloid mirror 20 by reflecting at each mirror surface.

The hyperboloid mirror 20 collects the reflected light lead by the polygon mirror 22 as received light Lr and leads to the light receiving unit 12 of receiving light IC 14. The hyperboloid mirror 20 has the same effect as a lens such that the received light Lr is formed as an image onto the light receiving unit 12 of the receiving light IC 14.

Each mirror surface of the polygon mirror 22 is provided to be tilted with respect to the rotational axis A. The polygon mirror 22 rotates around the rotational axis A as a center with a predetermined rotation speed. The respective mirror surfaces of the polygon mirror 22 are arranged such that angles formed with the rotational axis A are different from each other. Hence, a depression angle between the irradiation light Lt and the reflected light changes in response to the rotation of the polygon mirror 22. As a result, by rotating the polygon mirror 22, scanning is performed, with the irradiation light Lt from the light source 30, not only in the horizontal direction but also in the vertical direction with different depression angles. Therefore, scanning is performed planarly with the irradiation light Lt from the light source 30 and the irradiation light Lt us emitted towards the measurement object range.

The casing 26 includes a support structure that supports the above-described respective configurations and a control board 27. In the control board 27, a control unit 50 is provided. The control unit 50 is configured as a computer provided with a CPU and a memory. The control unit 50 is provided with an input interface and an output interface. A light receiving IC 14 is connected to the input interface, and a vehicle ECU (electronic control unit) is connected to the output interface. The control unit 50 outputs a distance image data and a signal intensity image data which are generated by the light receiving IC 14 to the ECU. The vehicle ECU detects an obstacle and measures a distance to the obstacle in accordance with the distance image data or the signal intensity image data acquired by the control unit 50.

Figure 2:
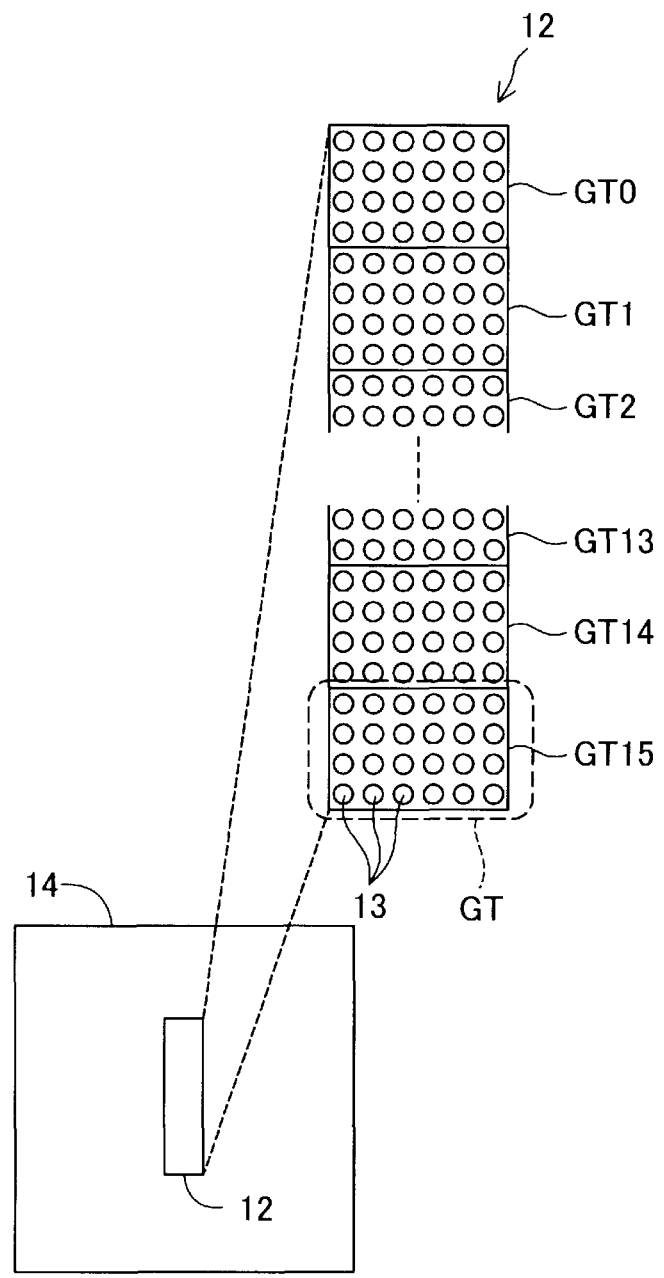
FIG. 2 is an explanatory diagram showing an overall configuration of a light receiving unit.

As shown in FIG. 2, the light receiving IC 14 includes a light receiving unit 12. The light receiving unit 12 includes a plurality of light receiving units capable of outputting a pulse signal in response to the incidence of the reflected light from an object. According to the present disclosure, the light receiving unit 12 is provided with a SPAD (single photon avalanche diode) 13. The light receiving unit 12 is configured as a silicon photo multiplier (SiPM) in which a plurality of SPADs 13 are arranged in an array. The light receiving unit 12 is configured of 16 pcs of pixel GTs (GT0 to GT 15) each composed of 24 SPADs 13 of 6-rows×4-columns. The 16 pcs of pixel GTs are arranged in the vertical direction. A size of a single pixel GT corresponds to one element size of the signal intensity image data and the distance image data which will be described later. Each SPAD 13 outputs, when receiving a photon, a pulse signal with a certain probability. Hence, each pixel GT outputs 0 to 24 pulse signals depending on the intensity of the received light.

Figure 3:
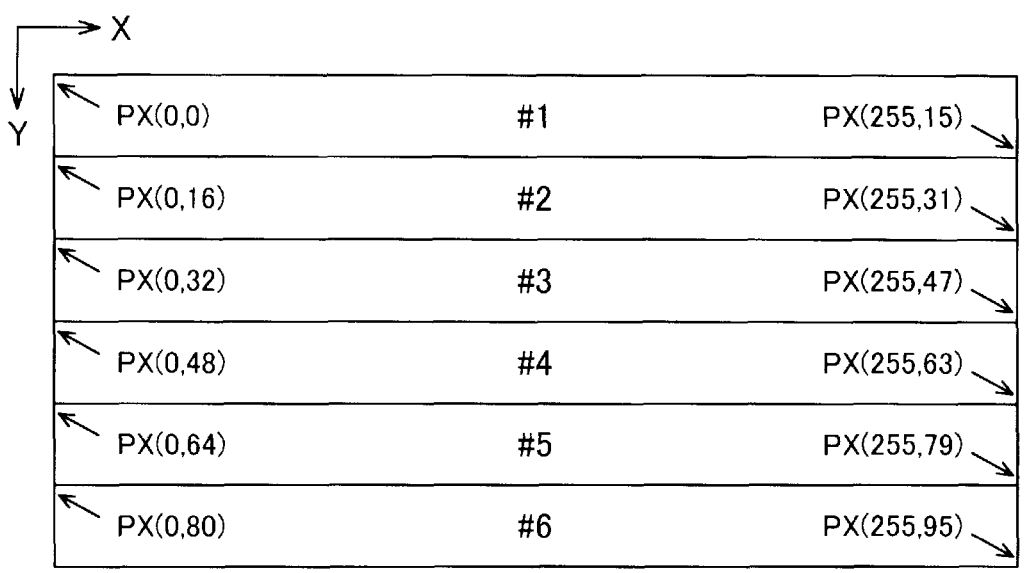
FIG. 3 is an explanatory diagram showing an image region corresponding to a measurement object range.

The beam shape of the pulse laser light emitted from the light source 30 is formed into a longitudinal shape in the vertical direction. The pixel GT of the light receiving unit 12 are arranged in the vertical direction as well. Since the reflected light returns to the light ranging apparatus 10 maintaining its longitudinal beam shape, the received light Lr having longitudinal beam shape enters the light receiving unit 12 along the arrangement direction of the pixel GTs. In other words, the reflected light pulse having the longitudinal shape corresponding to the 16 pixel GTs is received by the light receiving unit 12 at once. By the rotation of the polygon mirror 22, scanning is performed in the horizontal direction and the vertical direction with the irradiation light Lt and the received light Lr. Hence, the light scanned by the rotation of the polygon mirror 11 subsequently enters the light receiving unit 12. According to the present embodiment, as shown in FIG. 3, the polygon mirror 22 rotates by ⅙ rotation, whereby one mirror surface scans a belt-shaped region for 16 elements in the Y direction, and the polygon mirror 22 rotates by 1 rotation, whereby 6 mirror surfaces scan a surface region for 96 elements (=16 pixels×6 surfaces) in the Y direction. According to the present embodiment, the number of elements in the X direction is 256. The surface image region shown in FIG. 3 corresponds to a measurement object range to which the light source 30 emits light.

Figure 4:
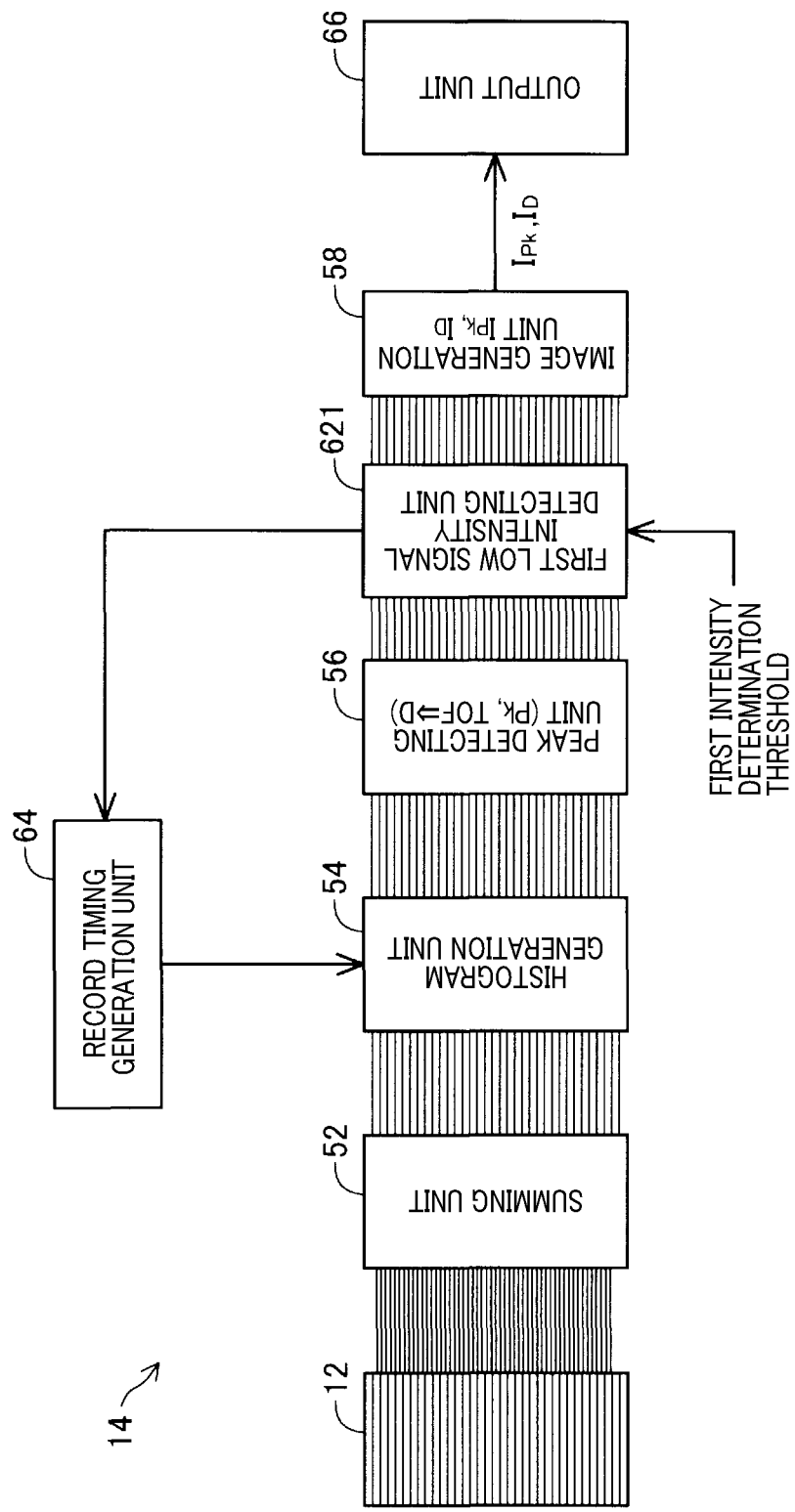
FIG. 4 is a block diagram showing a light receiving IC.

With reference to FIG. 4, a configuration of the light receiving IC 14 will be described. The light receiving IC 14 is provided with a light receiving unit 12, a summing unit 52, a histogram generation unit 54, a peak detecting unit 56, an image generation unit 58, a first low signal intensity detecting unit 621, a record timing generation unit 64 and an output unit 66. Among these, respective sections except the light receiving unit 12 may be accomplished by functional units of software in which the CPU included in the control unit 50 executes programs.

The summing unit 52 is a circuit that calculates a sum value by summing the number of pulses outputted from the light receiving unit 12. More specifically, the summing unit 52 counts, for each pixel GT, the number of pulses outputted simultaneously from the plurality of SPAD 13 included in the respective pixels GT, thereby acquiring the sum value for each pixel GT. For example, in the case where a pulse signal is outputted from 12 SPADs 13 among a plurality of SPADs 13 included in a single pixel GT, the summing unit 52 outputs 12 as a sum value to the histogram generation unit 54. Note that only one summing unit 52 is shown in FIG. 4, but one summing unit 52 is provided for each one pixel GT of the light receiving unit 12.

Figure 5:
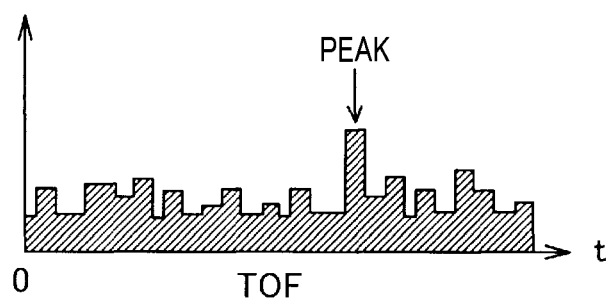
FIG. 5 is a diagram showing an example of a histogram.

The histogram generation unit 54 is a circuit that generates a histogram based on the sum value outputted from the summing unit 52. FIG. 5 shows an example of a histogram. The bin of the histogram (horizontal axis) represents the travelling time of the light from a time when the light is emitted to a time when the reflected light (received light) is received. Hereinafter, this time is referred to as TOF (time of flight). On the other hand, the frequency of the histogram (vertical axis) represents a sum value calculated by the summing unit 52 indicating the intensity of the light reflected by the object. The histogram generation unit 54 stores the sum value outputted by the summing unit 52 for each TOF in accordance with the timing signal received from the timing generation unit 64, thereby generating the histogram. In the case where an object is present within the measurement object range, the light is reflected by the object and the sum value is recorded at a TOF bin corresponding to the distance to the object. The peak in the histogram is determined as a maximum frequency in the histogram, representing a presence of the object at a location (distance) indicated by the TOF corresponding to the peak. The frequency of portions except the peak portion in the histogram represents noise from disturbance light. Note that only one histogram generation unit 54 is shown in FIG. 4, but the histogram generation unit 54 is provided for each pixel GT. Hence, the histogram is generated for all elements in the image region shown in FIG. 3. The histogram generation unit 54 stores the generated histograms into a histogram memory which is not shown.

The peak detecting unit 56 (FIG. 4) is a circuit that detects the peak in the histogram. The peak detecting unit 56 acquires the frequency (sum value) of the detected peak as a signal intensity and calculates the distance value based on the TOF corresponding to the peak. The peak detecting unit 56 calculates the distance value with the following equation (1) where TOF is t, the speed of light is c, distance value is D.

$$D=(c \times t)/2 \qquad \text{equation (1)}$$

Figure 7:
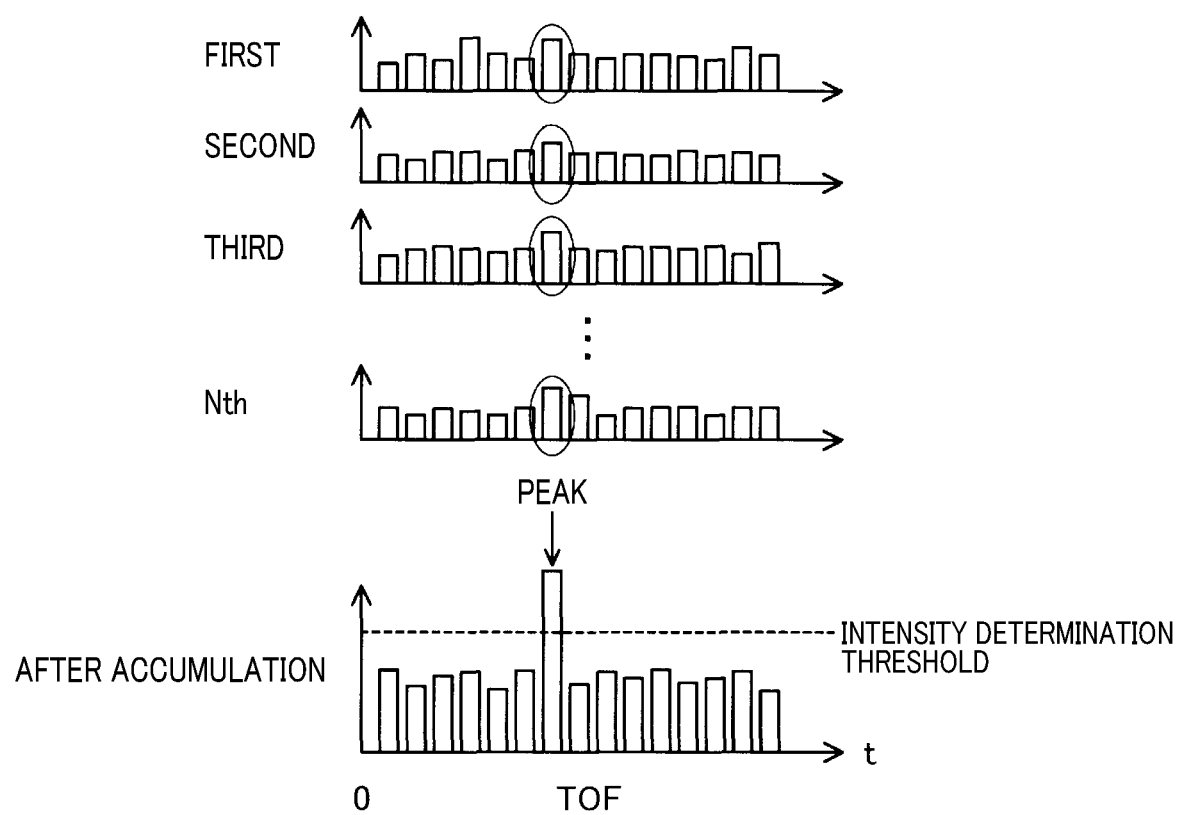
FIG. 7 is a diagram showing a state where the signal intensity is accumulated.

The first low signal intensity detecting unit 621 is a circuit that detects, from among the signal intensities acquired by the peak detecting unit 56, a low signal intensity which is lower than a first intensity determination threshold. When detecting the low signal intensity, the first low signal intensity detecting unit 621 makes the histogram generation unit 54 update the histogram through the record timing generation unit 64. Thus, for the histogram in which the low signal intensity is detected, as shown in FIG. 7, the histogram generation unit 54 acquires a new sum value for each TOF from the summing unit 52 and accumulates the sum value which has been recorded in the histogram. Then, until the low signal intensity is no longer detected by the first low signal intensity detecting unit 621, that is, until the peak of the sum value in the histogram (i.e. signal intensity) becomes the first intensity determination threshold or more, the sum value is repeatedly acquired and accumulated, whereby the histogram generation unit 54 updates the histogram. Note that the maximum number of times for capable of updating the histogram is determined based on the scan speed of the irradiated light of the light source 30 and the polygon mirror 22 and the detection speed of the reflected light by the light receiving unit 12. The histogram generation unit 54 is able to update, when continuously detecting the light while the light receiving unit 12 receives the reflected light from the same position in the measurement object range, the histogram for the detection number of times. The first intensity determination threshold is set to be within a range in which the accumulated sum value is able to reach until the number of updating the histogram reaches the maximum number.

Figure 6:
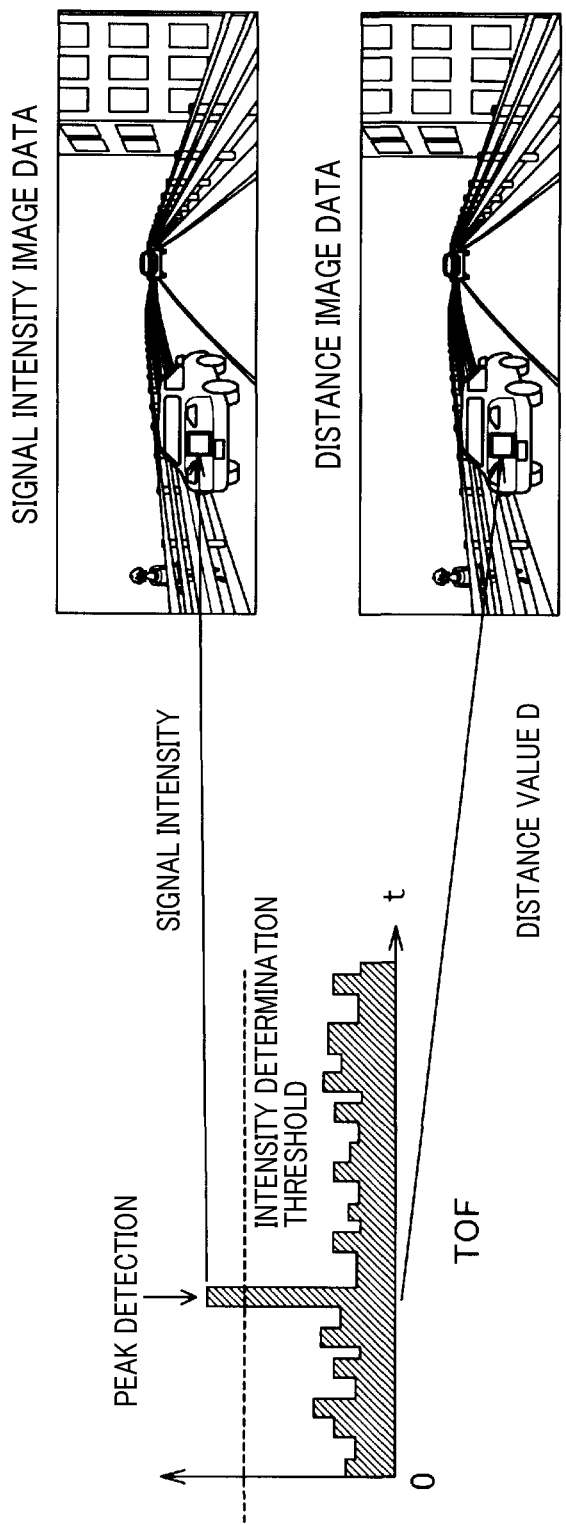
FIG. 6 is a diagram showing a method for generating a signal intensity image data and a distance image data.

The image generation unit 58 is a circuit that generates a signal intensity image data (I Pk) and a distance image data (I D). As shown in FIG. 6, the image generation unit 58 correlates the signal intensity of the peak detected by the peak detecting unit 56 with respective elements in the image region shown in FIG. 3, thereby generating the signal intensity image data. Also, as shown in FIG. 6, the image generation unit 58 correlates the distance value D calculated from the TOF by the peak detecting unit 56 with the respective elements in the image region shown in FIG. 3, thereby generating the distance image data. According to the present embodiment, as shown in FIGS. 2 and 3, this image data is generated with 16 elements unit corresponding to 16 pcs of pixel GT arranged in the longitudinal direction.

When the image generation unit 58 generates the signal intensity image data and the distance image data, the output unit 66 outputs these data to the control unit 50. Note that the image generation unit 58 may inhibit generation of either of the signal intensity image data and the distance image data.

Also, the output unit 66 may output either one of the signal intensity image data and the distance image data to the control unit 50.

According to the light ranging apparatus 10 of the above-described present embodiment, the sum value of the histogram is accumulated only when the signal intensity of the peak in the histogram is a low signal intensity. Hence, the number of accumulations of the sum value for generating the histogram can be reduced while expanding the dynamic range of elements having low signal intensity. As a result, in the case where the histogram is updated for the entire measurement object range, if the object to be measured is moving, the traveling time of the light changes so that the bin in which the addling value is accumulated is shifted and may cause decline of the ranging accuracy and the positional resolution. However, according to the present embodiment, since only a part of the histogram is updated, such kind of problem can be avoided. Further, an amount of calculation of the light receiving IC 14 can be reduced compared to a case where the histogram is updated for the entire measurement object range, thereby reducing the power consumption.

Second Embodiment

Figure 8:
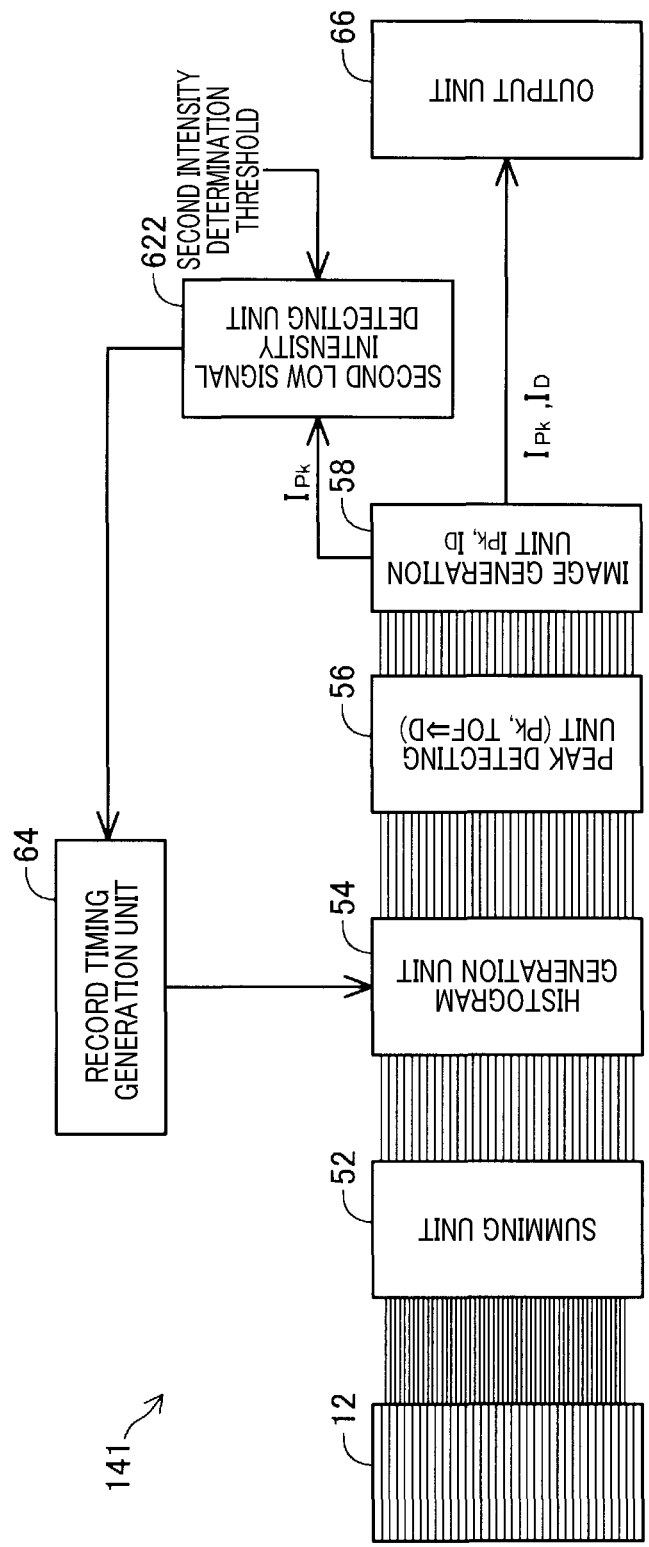
FIG. 8 is a block diagram showing a light receiving IC according to a second embodiment.

As shown in FIG. 8, a light receiving IC 141 of a light ranging apparatus 10 according to a second embodiment is provided with, similar to the first embodiment, a light receiving unit 12, a summing unit 52, a histogram generation unit 54, a peak detecting unit 56, an image generation unit 58, a record timing generation unit 64 and an output unit 66. The light receiving unit 141 according to the present embodiment is provided with a second low signal intensity detecting unit 622 instead of the first low signal intensity detecting unit 621. In the present embodiment, respective functions other than the second low signal intensity detecting unit 622 are the same as those in the first embodiment. The determining method whether a sum value in the histogram is accumulated differs between the first embodiment and the second embodiment.

According to the present embodiment, the second low signal intensity detecting unit 622 is a circuit that detects low signal intensity elements having a signal intensity lower than the second intensity determination threshold from the signal intensity image data generated by the image generation unit 58. According to the present embodiment, the low signal intensity detecting unit 62 subsequently accepts partial signal intensity image data composed of 16 elements arranged in the longitudinal direction and detects the low signal intensity elements from the partial signal intensity image data. The low signal intensity detecting unit 62 outputs a timing signal for storing the sum value at the record timing generation unit 64 when detecting the low signal intensity element, and causes the histogram generation unit 54 to update the histogram corresponding to the low signal intensity element.

The histogram generation unit 54, when the second low signal intensity detecting unit 622 detects the low signal intensity, updates the histogram corresponding to the element. Specifically, as shown in FIG. 7, for the histogram corresponding to the low signal intensity elements, the histogram generation unit 54 acquires a new sum value for each TOF from the summing unit 52 and accumulates the sum value which has been recorded in the histogram with the acquired sum value. According to the present embodiment, processes of updating the histogram by the histogram generating unit 54, generating of the signal intensity image data by the image generation unit 58 and detecting the low signal intensity by the second low signal intensity detecting unit 622 are repeatedly executed, whereby the histogram is repeatedly updated until the sum value in the histogram becomes the second intensity determination threshold or more.

According to the present embodiment, the image generation unit 58 generates the distance image data only when the signal intensities of the peaks in the respective histograms become the second intensity determination threshold or more. This is because, in the case where the peak signal intensity is small, it is possible that the peak is not a true peak and an error may possibly occur in the distance value. The second intensity determination threshold can be determined through an experiment performed in advance which determines a differentiable value of whether the peak is the true peak or a false peak due to noise.

As described, according to the present embodiment, in the case where low signal intensity element is present in the signal intensity image data, the histogram corresponding to the element is updated. Then, the peak detecting unit 56 calculates the new distance value from the updated histogram, and the image generation unit 58 generates the distance image data using the new distance value. The distance image data is outputted to the control unit 50 via the output unit 66, when the image generation unit 58 generates the distance image data. Note that the output unit 66 may output the signal intensity image data generated by the image generation unit 58 to the control unit 50.

According to the above-described second embodiment, only for the low signal intensity element in the signal intensity image data generated in accordance with the peak value of a histogram, an accumulation of the sum value of the corresponding histogram is performed. Hence, similar to the first embodiment, the number of accumulations of the sum value for generating the histogram can be reduced. Accordingly, the same effects and advantages as those in the first embodiment can be obtained.

Third Embodiment

Figure 9:
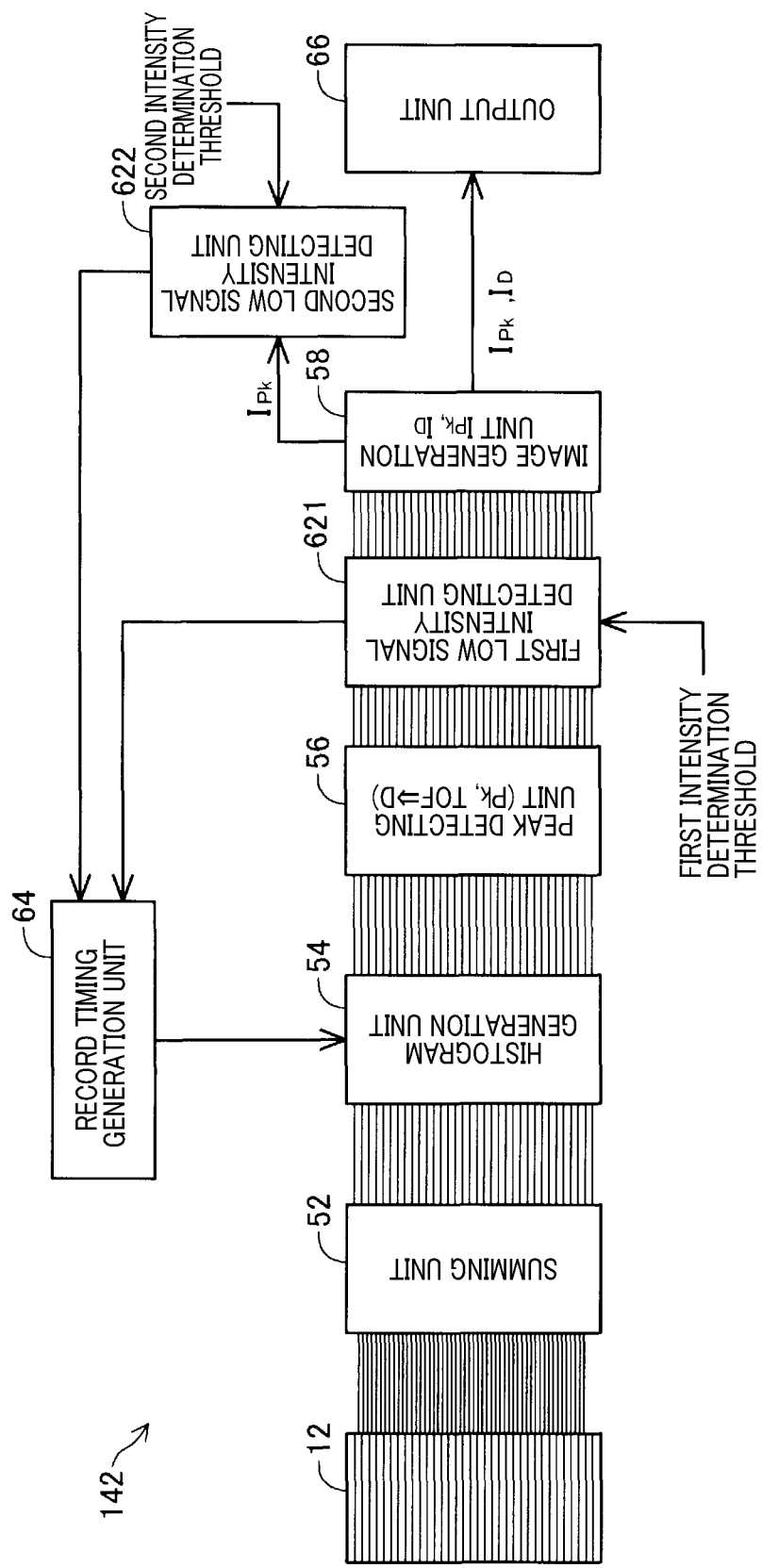
FIG. 9 is a block diagram showing a light receiving IC according to a third embodiment.

As shown in FIG. 9, a light receiving IC 142 of a light ranging apparatus 10 according to a third embodiment is provided with, similar to the first and second embodiments, a light receiving unit 12, a summing unit 52, a histogram generation unit 54, a peak detecting unit 56, an image generation unit 58, a record timing generation unit 64 and an output unit 66. The light receiving IC 142 of the present embodiment is provided with both of the first low signal intensity detecting unit 621 described in the first embodiment and the second low signal intensity detecting unit 622 described in the second embodiment. According to this configuration, the signal intensity of the signal intensity detected by the second low signal intensity detecting unit 622 always exceeds the first intensity determination threshold. Hence, the second intensity determination threshold is set to be larger than the first intensity determination threshold. Moreover, in the case where the second low signal intensity detecting unit 622 updates the histogram, since the peak of the histogram already exceeds the first intensity determination threshold, the first low signal intensity detecting unit 621 no longer updates the histogram.

According to the third embodiment thus configured, the histogram is updated using the first low signal intensity detecting unit 621, whereby the S/N ratio of the histogram can be improved overall. Also, the signal intensity value can be larger for elements having significantly low signal intensity among the signal intensity image data by using the second low signal intensity detecting unit 622. Accordingly, the signal intensity image data having better S/N ratio and the distance image data where the high accurate distance value is recorded can be generated.

Modifications of First to Third Embodiments

According to the above-described embodiments, for example, the respective determination thresholds can be determined such that the sum value outputted by the summing unit 52 in response to the light receiving unit 12 receiving the reflected light having expected maximum intensity is multiplied by a predetermined ratio. Further, for example, the light ranging apparatus 10 calculates an average value of respective signal intensities of the histogram, which is generated while the light source 30 is not irradiating light, to be the noise level, and a value in which the noise level is subtracted from the measured peak may be compared with an intensity determination threshold where the noise level is subtracted. Further, the light ranging apparatus 10 calculates the SN ratio from the peak and the noise level, and may compare the SN ratio with an intensity determination threshold which is converted to the SN ratio.

In the above-described embodiments, the light ranging apparatus 10 may change the respective intensity determination threshold depending on the disturbance light quantity. Specifically, the light ranging apparatus 10 may generate the histogram while the light source 30 is not irradiating light, and calculate the average value of the respective signal intensities of the histogram to be the disturbance light quantity. Then, the light ranging apparatus 10 sets the intensity determination threshold such that the smaller the disturbance light quantity, the smaller the intensity determination threshold is. Thus, the sensitivity at night time can be higher. Hence, the measurement accuracy can be improved.

In the above-described embodiments, the light ranging apparatus 10 may set a limitation on the number of updates of the histogram and may calculate, when the sum value does not reach the intensity determination threshold despite accumulating for a predetermined number, the distance value based on the peak of the sum value at the moment. Moreover, if the sum value does not reach the intensity determination threshold despite the accumulation, the distance value may not calculate a distance value for that element. In the case where the distance value is not calculated, for the elements excluded from calculation of the distance value, the number of counts excluded from calculation is stored for each element. Then, when the number of counts reaches a predetermined number or more, thereafter, calculation of the distance value may not be performed for the element where the number of counts reaches the predetermined number or more. Thus, for example, it is not required to calculate the distance value for a region such as the sky in which the distance value is unable to be calculated. Hence, an amount of calculation can be reduced.

In the above-described embodiments, the light ranging apparatus 10 may acquire the horizontal line and a vanishing point based on the continuity of the distance value (space continuity) between elements of the distance image data and determine an image region in the upper area of the horizontal line or the vanishing point to be a region of the sky. Then, the light ranging apparatus 10 may not generate the histogram, the signal intensity image data and the distance image data for the determined region. Thus, an amount of calculation can be reduced.

In the above-described embodiments, in the case where the peak does not exceed the intensity determination threshold even when the histogram is updated, the light ranging apparatus 10 may substitute the latest past value for the elements corresponding to the signal intensity image data or the distance image data. Thus, a region where the distance value is not present on the distance image data can be prevented from being generated.

In the above-described embodiments, the light ranging apparatus 10 may output an error signal to external equipment via the control unit 50 in the case where the number of elements where the peak does not exceed the intensity determination threshold exceeds a predetermined number. Thus, possible fault of the light receiving IC 14 can be externally notified.

In the above-described embodiments, the light ranging apparatus 10 repeatedly updates the histogram until the sum value of the peak in the histogram exceeds the intensity determination threshold. However, the light ranging apparatus 10 may update the histogram once or for a predetermined number of times, calculate the distance value based on the peak after the updating regardless of the intensity threshold, and then generate the distance image data.

Figure 10:
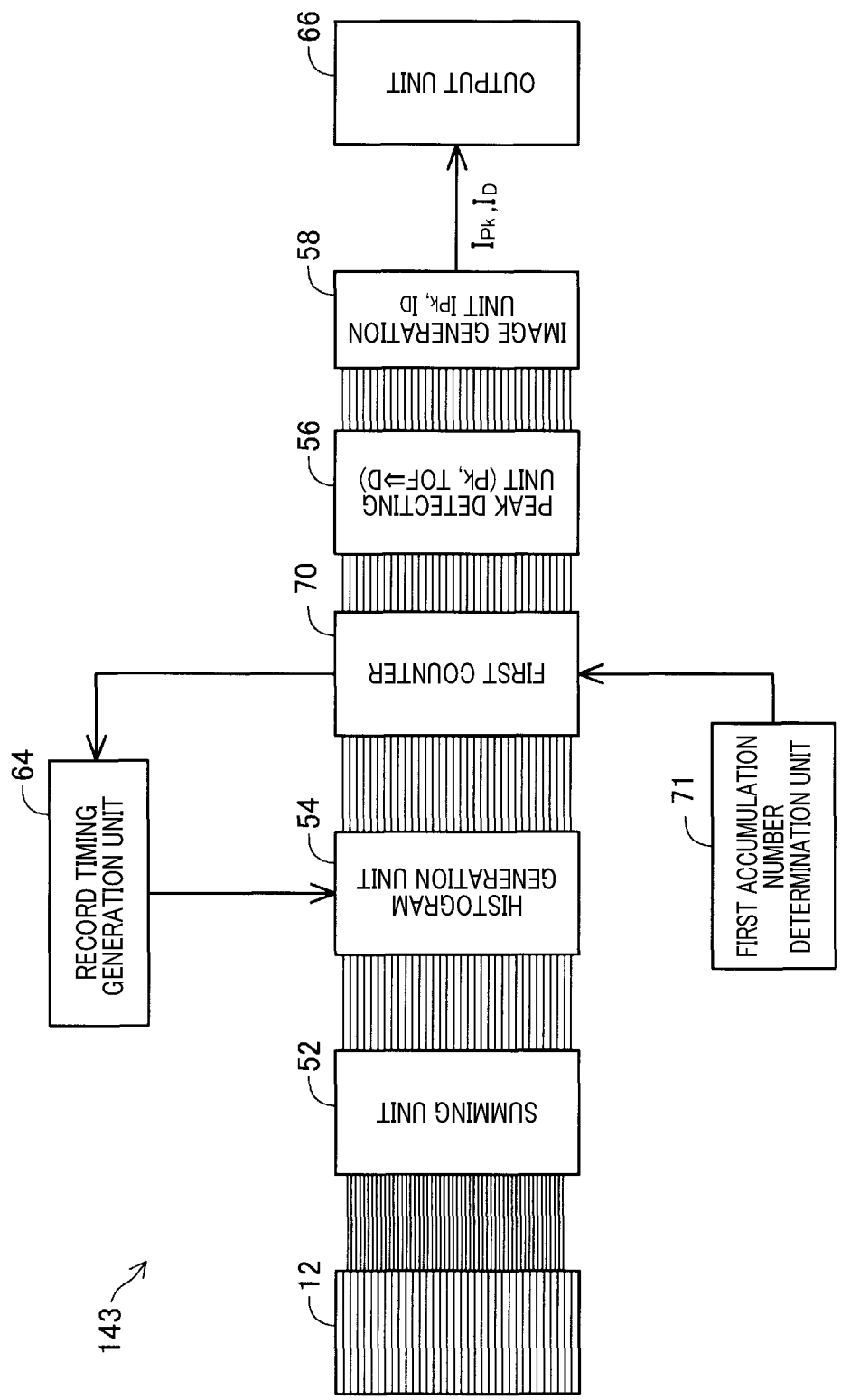
FIG. 10 is a block diagram showing a light receiving IC according to a fourth embodiment.

In the above-described embodiments, the light ranging apparatus 10 may update the histogram for a predetermined number of times, determine whether the peak is lower than the intensity determination threshold. Then, when determining that the peak is lower than the intensity determination threshold, the light ranging apparatus 10 may update the histogram for a number of times which is larger than the predetermined number of times Fourth Embodiment As shown in FIG. 10, the light receiving IC 143 of the light ranging apparatus 10 according to the fourth embodiment is provided with, similar to the first embodiment, a light receiving unit 12, a summing unit 52, a histogram generation unit 54, a peak detecting unit 56, an image generation unit 58, a record timing generation unit 64 and an output unit 66. The light receiving IC 143 of the present embodiment is provided with, in addition to the above units, a first counter 70 between the histogram generation unit 54 and the peak detecting unit 56, and a first accumulation number determination unit 71 connected to the first counter 70.

The first counter 70 is a circuit that counts the number of accumulations of the sum value to be recorded in the histogram. The first accumulation number determination unit 71 is a circuit that acquires the disturbance light quantity for each histogram and determines the number of accumulations of the sum value depending on the disturbance light quantity. The first counter 70 causes the record timing generation unit 64 to output the timing signal for recording the sum value for the determined number of times determined by the first accumulation number determination unit 71. The histogram generation unit 54 repeatedly performs an acquisition of the sum value and an accumulation for the number of times determined by the first accumulation number determination unit 71, thereby generating the histogram.

Figure 11:
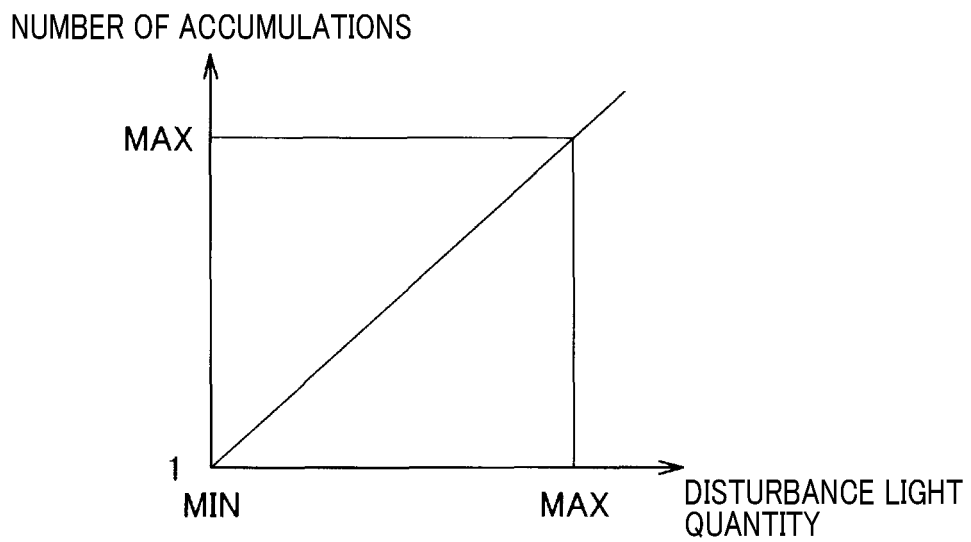
FIG. 11 is a diagram showing a relationship between a disturbance light quantity and the number of accumulations.
Figure 12:
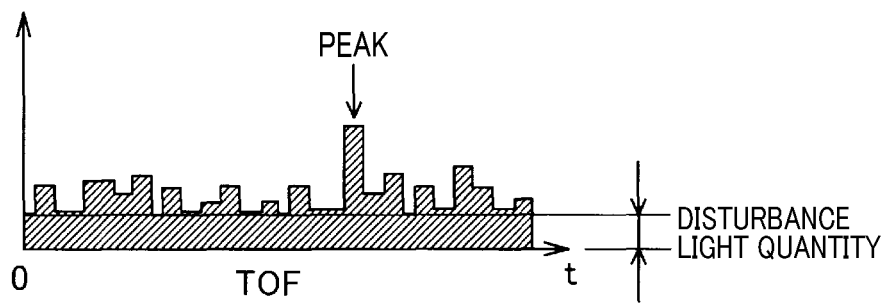
FIG. 12 is a diagram showing a disturbance light quantity.

As shown in FIG. 11, the first accumulation number determination unit 71 determines the number of accumulations to be proportional to the disturbance light quantity. As shown in FIG. 12, the disturbance light quantity corresponds to a baseline in the histogram when the sum value is not accumulated. According to the present embodiment, the first accumulation number determination unit 71 detects the minimum value in the respective sum values of the histogram as the baseline of the histogram and identifies the detected value to be the disturbance light quantity. The first accumulation number determination unit 71 determines the number of accumulations such that the larger the disturbance light quantity, the larger the number of accumulations is. Note that the minimum value of the accumulations is 1, and the maximum value of the number of accumulations is determined in accordance with the characteristics of the control system for the light ranging apparatus 10 such as the scanning speed of the irradiation light and the detection speed of the reflected light by the light receiving unit 12. Also, the maximum value and the minimum value of the disturbance light quantity is determined in accordance with the characteristics of the optical system such as the polygon mirror 22 and the hyperboloid mirror 20 of the light ranging apparatus 10.

According to the light ranging apparatus 10 of the present embodiment as described above, the number of accumulations of sum values can be determined for each histogram depending on the disturbance light quantity. Hence, the number of accumulations of the sum values for generating the histogram can be reduced compared to the case where the sum values are accumulated for the same number of times for or all histograms. Accordingly, an amount of calculation of the light receiving IC 14 can be reduced, thereby reducing the power consumption. Further, according to the present embodiment, since the number of accumulations is set to be larger as the disturbance light quantity becomes larger, the SN ratio of the histogram can be appropriately adjusted depending on the disturbance light quantity. According to the present embodiment, the baseline of the histogram is set to be the minimum value of the respective sum values in the histogram. However, the baseline of the histogram may be the average value of the respective sum values in the histogram.

Fifth Embodiment

Figure 13:
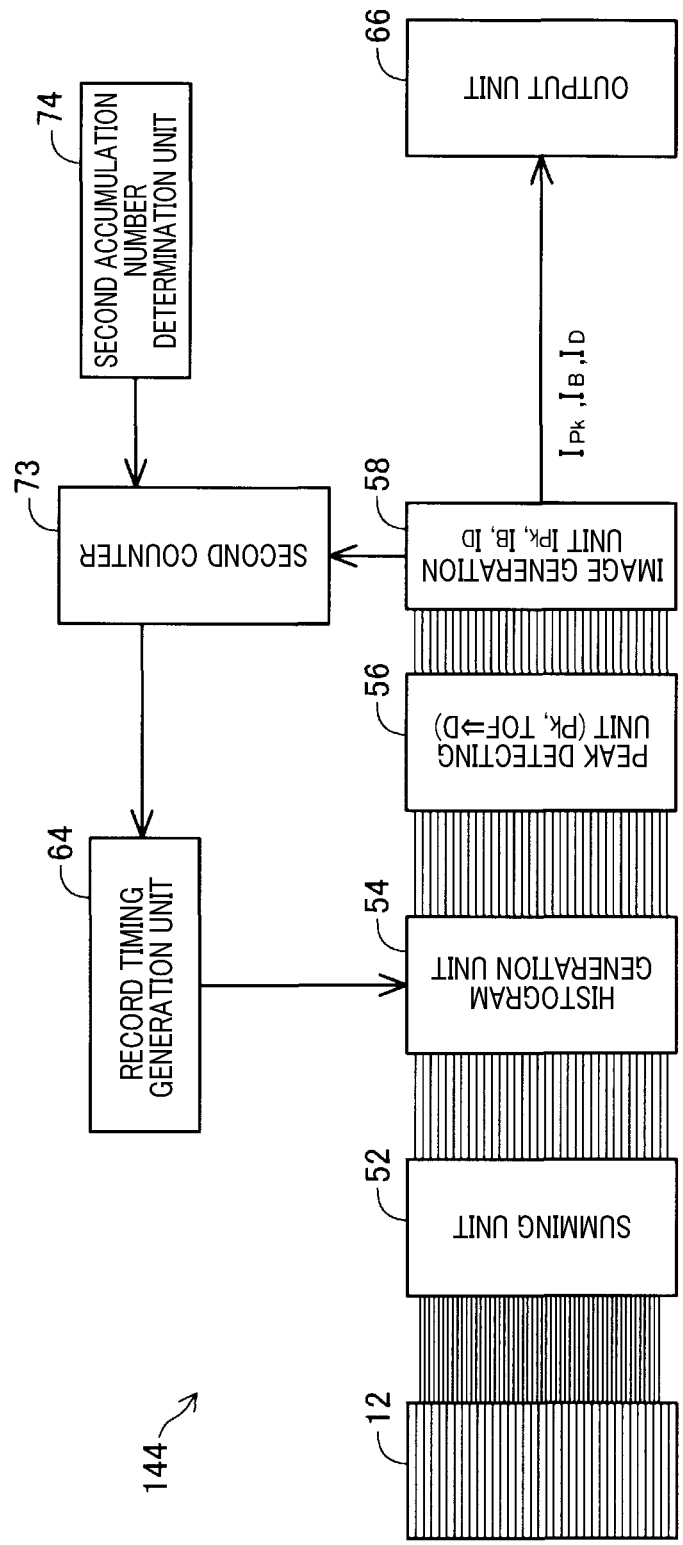
FIG. 13 is a block diagram showing a light receiving IC according to a fifth embodiment.

As shown in FIG. 13, the light receiving IC 144 of the light ranging apparatus 10 according to the fifth embodiment is provided with, similar to the fourth embodiment, a light receiving unit 12, a summing unit 52, a histogram generation unit 54, a peak detecting unit 56, an image generation unit 58, a record timing generation unit 64 and an output unit 66. The light receiving IC 144 is provided with a second counter 73 instead of the first counter 70. Moreover, the light receiving IC 144 is provided with a second accumulation number determination unit 74 instead of the first accumulation number determination unit 71.

According to the present embodiment, the image generation unit 58 correlates the disturbance light quantity corresponding to the baseline of the histogram before accumulation with the respective elements of the image region shown in FIG. 3, thereby generating luminance image data (IB). In other words, for the luminance image data, disturbance light quantity is recorded for each of the elements constituting the luminance image data. The second accumulation number determination unit 74 refers to the luminance image data and determines the number of accumulations of the sum values for each element depending on the disturbance light quantity. According to the present embodiment, similar to the fourth embodiment, the number of accumulations is determined such that the larger the disturbance light quantity, the larger the number of accumulations. The second counter 73 causes the record timing generation unit 64 to output the timing signal for recording the sum value for the determined number of times determined by the second accumulation number determination unit 71. The histogram generation unit 54 repeatedly performs an acquisition of the sum value and an accumulation for the number of times determined by the second accumulation number determination unit 74, thereby updating the histogram. The peak detecting unit 56 calculates new distance values from the histogram thus updated. Then, the image generating unit 58 generates the distance image data using the new distance value.

According to the light ranging apparatus 10 of the present embodiment as described above, the luminance image data is generated based on the disturbance light quantity calculated for each histogram, and the number of accumulations of sum values can be determined for each histogram depending on the disturbance light quantity in the luminance image data. Hence, the number of accumulations of the sum value for generating the histogram can be reduced compared to the case where the sum values are accumulated for the same number of times for all histograms. Accordingly, the amount of calculation of the light receiving IC 14 can be reduced, thereby reducing the power consumption of the light ranging apparatus 10. Further, according to the present embodiment, since the number of accumulations is set to be larger as the disturbance light quantity becomes larger, the SN ratio of the histogram can be appropriately adjusted depending on the disturbance light quantity.

Sixth Embodiment

Figure 14:
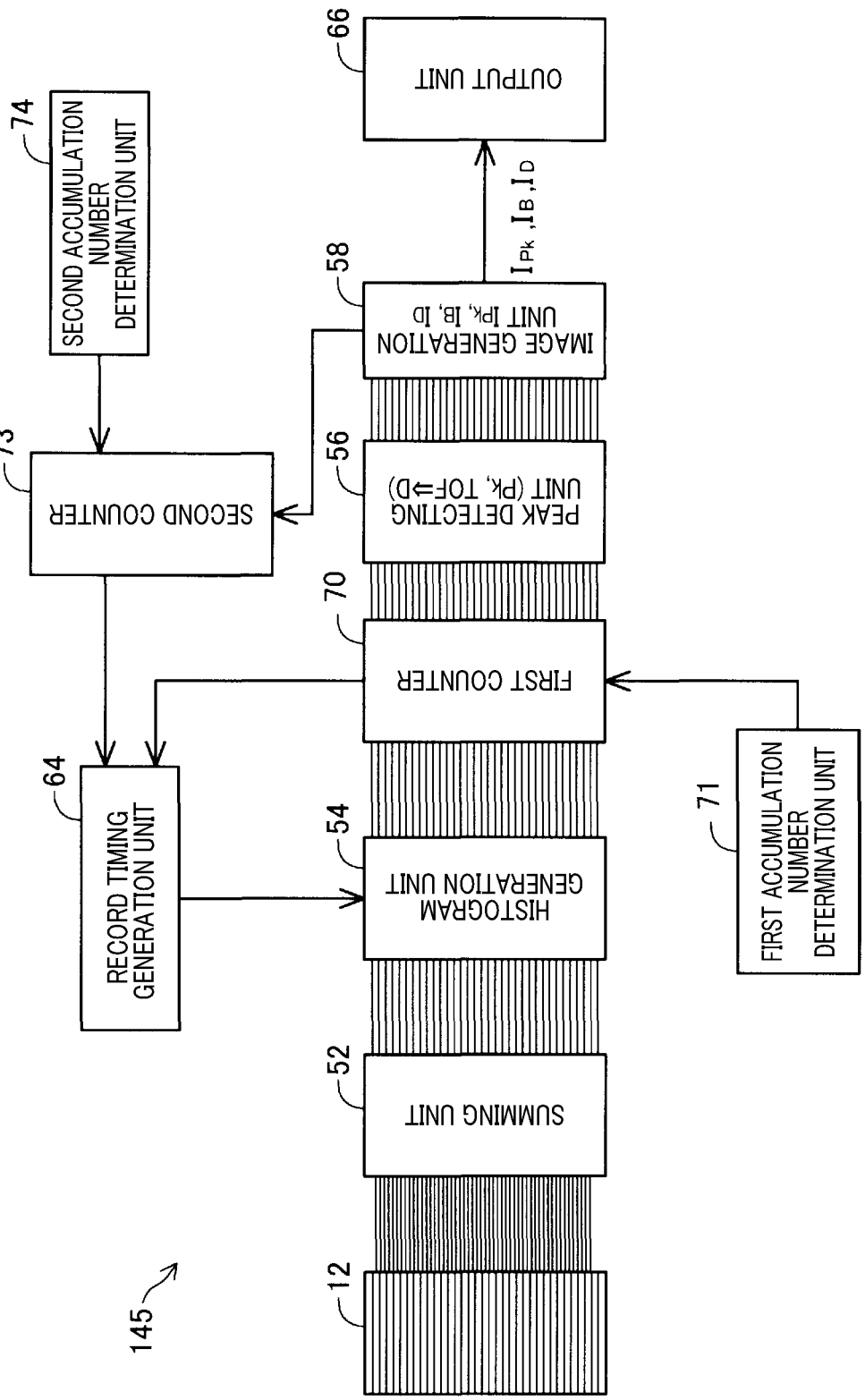
FIG. 14 is a block diagram showing a light receiving IC according to a sixth embodiment.

As shown in FIG. 14, the light receiving IC 145 of the light ranging apparatus 10 according to the sixth embodiment is provided with, similar to the fourth and fifth embodiments, a light receiving unit 12, a summing unit 52, a histogram generation unit 54, a peak detecting unit 56, an image generation unit 58, a record timing generation unit 64 and an output unit 66. Further, the light receiving IC 145 is provided with the first counter 70, the first accumulation number determination unit 71 described in the fourth embodiment, the second counter 73 and the second accumulation number determination unit 74 described in the fifth embodiment. According to such a configuration, the first counter 70 and the first accumulation number determination unit 71 are used, whereby the number of accumulations and the sum value are accumulated depending on the disturbance light quantity to generate the histogram. Further, the second counter 73 and the second accumulation number determination unit 74 are used, whereby the number of accumulations is further determined depending on the disturbance light recorded in the luminance image data. The luminance image data records a disturbance light quantity corresponding to the baseline of the histogram after the sum values are accumulated by the first counter 70 and the first accumulation number determination unit 71. Therefore, the number of accumulations determined by the second accumulation determination unit 74 according to the present embodiment is determined based on the disturbance light quantity after the accumulation such that the larger the disturbance light quantity, the larger the number of accumulations is.

According to the sixth embodiment thus configured, the number of accumulations of the sum value can be determined for each histogram depending on the disturbance light quantity. Further, the number of accumulations can be further determined for each element of the image based on the luminance image data. Hence, the SN ratio is improved for each histogram, and further the SN ratio in a part of the histogram having low SN ratio can be improved for the entire image. Therefore, the distance image data in which distance value having high accuracy can be generated.

Other Embodiments

The light ranging apparatus 10 according to the above-described embodiments employs a co-axial type optical system in which the light axis in light projection and the light axis in light reception coincide. In contrast, according to the above-described embodiments, the light ranging apparatus 10 may employ a different axis type optical system in which the light axis in light projection and the light axis in light reception are different. Further, according to the above-described embodiments, the pixel GTs of the light receiving unit 12 are arranged in the vertical direction. However, the pixel GTs may be arranged planarly in the vertical direction and the horizontal direction. Moreover, the scanning method of the light ranging apparatus 10 may be a 1D scanning method in which rectangular-strip shaped light is scanned in one direction, or may be a 2D scanning method in which point-shaped light is scanned in the two-dimensional direction. Further, the light ranging apparatus 10 may be configured as a flash type apparatus irradiating light in a wide direction.

In the above-described embodiments, each of the number of mirror surfaces of the polygon mirror 22, the number of pixel GTs constituting the light receiving unit 12, the number of SPADs 13 constituting the pixel GT, the number of elements of signal intensity image data, and the number elements of the distance image data is an example configuration. Hence, it is not limited to these numbers exemplified in the above-described embodiments, but may be appropriately changed depending on the specification of the light ranging apparatus 10.

The present disclosure is not limited to the above-described embodiments, but can be accomplished in various configurations without departing from the scope of the present disclosure. For example, the technical features in the respective embodiments may be appropriately replaced or combined in order to solve a part of the above-described problems or all problems. Further, in the case where the technical features are not described as necessary elements in the present specification, the technical features may be appropriately omitted.

CONCLUSION

According to the first aspect of the present disclosure, a light ranging apparatus is provided. The light ranging apparatus is provided with a light source that emits light irradiating a predetermined range; a light receiving unit having a plurality of light receiving elements capable of outputting a pulse signal in response to incidence of reflected light from an object irradiated by the light; a summing unit that calculates a sum value for each respective light receiving elements by summing the number of pulses outputted by each respective light receiving elements; a histogram generation unit that generates a histogram for each element in an image region corresponding to the predetermined range, the histogram recording the sum value for each travelling time indicating a time from when the light is emitted to a time when the light is received; a peak detecting unit that detects a peak from the histogram, acquires the sum value of the peak to be a signal intensity and calculates a distance value based on the travelling time corresponding to the peak; a first low signal intensity detecting unit that detects a low signal intensity from among signal intensities acquired by the peak detecting unit, the low signal intensity being lower than a predetermined first threshold.

The histogram generation unit repeatedly acquires and accumulates the sum value for the histogram in which the low signal intensity is detected until the signal intensity becomes the first threshold or more, thereby updating the histogram; and the peak detecting unit calculates a new distance value from the updated histogram.

According to the light ranging apparatus of this aspect, since the sum value of the histogram is accumulated only when the signal intensity of the peak in the histogram is determined as a low signal intensity, the number of accumulations of the sum value required for generating the histogram can be reduced.

According to the second aspect of the present disclosure, a light ranging apparatus is provided. The light ranging apparatus is provided with a light source that emits light irradiating a predetermined range; a light receiving unit having a plurality of light receiving elements capable of outputting a pulse signal in response to incidence of reflected light from an object irradiated by the light; a summing unit that calculates a sum value by summing the number of pulses outputted by the respective light receiving elements; a histogram generation unit that generates a histogram for each element in an image region corresponding to the predetermined range, the histogram recording the sum value for each travelling time indicating a time from when the light is emitted to a time when the light is received; a peak detecting unit that detects a peak from the histogram, acquires the sum value of the peak to be a signal intensity and calculates a distance value based on the travelling time corresponding to the peak; an image generation unit that correlates the signal intensity with each element to generate a signal intensity image data and correlates the distance value with each element to generate distance image data; and a second low signal intensity detecting unit that detects a low signal intensity element from among the signal intensity image data, the low signal intensity element having a low signal intensity which is lower than a predetermined second threshold.

The histogram generation unit, for a histogram corresponding to the low signal intensity element, acquires a new sum value for each travelling time from the summing unit, accumulates the sum value which has been recorded in the histogram, thereby updating the histogram; the peak detecting unit calculates a new distance value from the updated histogram; and the image generation unit uses the new distance value to generate the distance image data.

According to the light ranging apparatus of this aspect, only for the low signal intensity element in the signal intensity image data generated based on the peak value of the histogram, the sum value of the corresponding histogram is accumulated. Hence, the number of accumulations of the sum value for generating the histogram can be reduced.

According to a third aspect of the present disclosure, a light ranging apparatus is provided. The light ranging apparatus is provided with a light source that emits light irradiating a predetermined range; a light receiving unit having a plurality of light receiving elements capable of outputting a pulse signal in response to incidence of reflected light from an object irradiated by the light; a summing unit that calculates a sum value by summing the number of pulses outputted by respective light receiving elements; a histogram generation unit that generates a histogram for each element in an image region corresponding to the predetermined range, the histogram recording the sum value for each travelling time indicating a time from when the light is emitted to a time when the light is received; a peak detecting unit that detects a peak from the histogram, and calculates a distance value based on the travelling time corresponding to the peak; and a first accumulation number determination unit that acquires a disturbance light quantity for each histogram and determines the number of accumulations of the sum value depending on the disturbance light quantity.

The histogram generation unit repeatedly acquires and accumulates the sum value for the number of accumulations determined by the first accumulation number determination unit, thereby generating the histogram.

According to the light ranging apparatus of this aspect, since the number of accumulations of the sum value is determined in accordance with the disturbance light quantity for each histogram, the number of accumulations of the sum values for generating the histogram can be reduced compared to the case where the sum values are accumulated for the same number of times for or all histograms.

According to the fourth aspect of the present disclosure, a light ranging apparatus is provided. The light ranging apparatus is provided with a light source that emits light irradiating a predetermined range; a light receiving unit having a plurality of light receiving elements capable of outputting a pulse signal in response to incidence of a reflected light from an object irradiated by the light; a summing unit that calculates a sum value for each respective light receiving elements by summing the number of pulses outputted by each respective light receiving elements; a histogram generation unit that generates a histogram for each element in an image region corresponding to the predetermined range, the histogram recording the sum value for each travelling time indicating a time from when the light is emitted to a time when the light is received; a peak detecting unit that detects a peak from the histogram, acquires the sum value of the peak to be a signal intensity and calculates a distance value based on the travelling time corresponding to the peak; an image generation unit that correlates the signal intensity for each element to generate signal intensity image data, correlates the distance value with the each element to generate distance image data, and acquires a disturbance light quantity for each histogram to generate luminance image data in which the light disturbance quantity is recorded correlating with each element; and a second accumulation number determination unit that determines the number of accumulations of the sum values for each element depending on the disturbance light quantity recorded in the luminance image data.

The histogram generation unit repeatedly acquires and accumulates the sum value for the number of accumulations determined by the second accumulation number determination unit, thereby updating the histogram; the peak detecting unit calculates a new distance value from the updated histogram; and the image generation unit uses the new distance value to generate the distance image data.

According to the light ranging apparatus of this aspect, the luminance image data is generated based on the disturbance light quantity calculated for each histogram, and the number of accumulations of sum values can be determined for each histogram depending on the disturbance light quantity in the luminance image data. Hence, the number of accumulations of the sum value for generating the histogram can be reduced compared to the case where the sum values are accumulated for the same number of times for all histograms.

What is claimed is:

1. A light ranging apparatus comprising:
a light source that emits light irradiating a predetermined range;
a light receiving unit having a plurality of light receiving elements capable of outputting a pulse signal in response to incidence of reflected light from an object irradiated by the light;
a summing unit that calculates a sum value for each respective light receiving elements by summing the number of pulses outputted by each respective light receiving elements;
a histogram generation unit that generates a histogram for each element in an image region corresponding to the predetermined range, the histogram recording the sum value for each travelling time indicating a time from when the light is emitted to a time when the light is received;
a peak detecting unit that detects a peak from the histogram, acquires the sum value of the peak to be a signal intensity and calculates a distance value based on the travelling time corresponding to the peak; and
a first low signal intensity detecting unit that detects a low signal intensity from among signal intensities acquired by the peak detecting unit, the low signal intensity being lower than a predetermined first threshold,
wherein
the histogram generation unit repeatedly acquires and accumulates the sum value for the histogram in which the low signal intensity is detected until the signal intensity becomes the first threshold or more, thereby updating the histogram; and
the peak detecting unit calculates a new distance value from the updated histogram.

2. A light ranging apparatus comprising:
a light source that emits light irradiating a predetermined range;
a light receiving unit having a plurality of light receiving elements capable of outputting a pulse signal in response to incidence of a reflected light from an object irradiated by the light;
a summing unit that calculates a sum value for each respective light receiving elements by summing the number of pulses outputted by each respective light receiving elements;
a histogram generation unit that generates a histogram for each element in an image region corresponding to the predetermined range, the histogram recording the sum value for each travelling time indicating a time from when the light is emitted to a time when the light is received;
a peak detecting unit that detects a peak from the histogram, acquires the sum value of the peak to be a signal intensity and calculates a distance value based on the travelling time corresponding to the peak;
an image generation unit that correlates the signal intensity with the-each element to generate a signal intensity image data and correlates the distance value with the each element to generate a distance image data; and
a second low signal intensity detecting unit that detects a low signal intensity element from among the signal intensity image data, the low signal intensity element having low signal intensity which is lower than a predetermined second threshold,
wherein
the histogram generation unit, for a histogram corresponding to the low signal intensity element, acquires a new sum value for the each travelling time from the summing unit, accumulates the sum value which has been recorded in the histogram, thereby updating the histogram;
the peak detecting unit calculates a new distance value from the updated histogram; and
the image generation unit uses the new distance value to generate the distance image data.

3. The light ranging apparatus according to claim 1 further comprising:
an image generation unit that correlates the signal intensity with the-each element to generate a signal intensity image data and correlates the distance value with the each element to generate a distance image data; and
a second low signal intensity detecting unit that detects a low signal intensity element from among the signal intensity image data, the low signal intensity element having low signal intensity which is lower than a predetermined second threshold,
wherein
the histogram generation unit, for a histogram corresponding to the low signal intensity element, acquires a new sum value for the each travelling time from the summing unit, accumulates the sum value which has been recorded in the histogram, thereby updating the histogram;
the peak detecting unit calculates a new distance value from the updated histogram; and
the image generation unit uses the new distance value to generate the distance image data.

* * * * *